US006779082B2

(12) United States Patent
Burger et al.

(10) Patent No.: US 6,779,082 B2
(45) Date of Patent: Aug. 17, 2004

(54) NETWORK-BASED DISK REDUNDANCY STORAGE SYSTEM AND METHOD

(75) Inventors: Eric William Burger, McClean, VA (US); Walter Joseph O'Connor, Nashua, NH (US); Andy Spitzer, North Andover, MA (US); Barry David Wessler, Potomac, MD (US)

(73) Assignee: Ulysses ESD, Inc., San Jose, CA (US)

( * ) Notice: Subject to any disclaimer, the term of this patent is extended or adjusted under 35 U.S.C. 154(b) by 476 days.

(21) Appl. No.: 09/777,776

(22) Filed: Feb. 5, 2001

(65) Prior Publication Data

US 2002/0144058 A1 Oct. 3, 2002

(51) Int. Cl.⁷ .............................................. G06F 12/00
(52) U.S. Cl. .......................... 711/114; 711/162; 711/4
(58) Field of Search ................................ 711/114, 162, 711/112, 4

(56) References Cited

U.S. PATENT DOCUMENTS

| | | | | |
|---|---|---|---|---|
| 5,511,177 A | * | 4/1996 | Kagimasa et al. | 711/114 |
| 5,673,381 A | * | 9/1997 | Huai et al. | 714/1 |
| 5,751,883 A | | 5/1998 | Ottesen et al. | 386/27 |
| 5,819,310 A | * | 10/1998 | Vishlitzky et al. | 711/114 |
| 6,138,139 A | | 10/2000 | Beck et al. | 709/202 |
| 6,167,494 A | * | 12/2000 | Cheston et al. | 711/162 |
| 6,298,356 B1 | | 10/2001 | Jawahar et al. | 707/201 |
| 6,467,034 B1 | * | 10/2002 | Yanaka | 711/162 |
| 6,493,825 B1 | * | 12/2002 | Blumenau et al. | 713/168 |

FOREIGN PATENT DOCUMENTS

WO PCT/US02/03315 5/2002

OTHER PUBLICATIONS

Udo Kelter, "Discretionary Access Controls in a High-Performance Object Management System", IEEE 1991, p. 288–299.

* cited by examiner

Primary Examiner—Donald Sparks
Assistant Examiner—Brian R. Peugh
(74) Attorney, Agent, or Firm—Morgan, Lewis & Bockius LLP (57) ABSTRACT

An embodiment of the invention described in the specification and drawings is a distributed and highly available data storage system. In one embodiment, the distributed data storage system includes a plurality of data storage units that are controlled by an object management system. The object management system preferentially selects the distributed data storage units for performing the file access requests according to the external inputs/outputs with which the file access requests are associated. In response to a file creation request that is associated with an external input of one distributed data storage unit, the object management system preferentially creates a data file in that distributed data storage unit. In response to a file retrieval request that is associated with a data file and an external output of a distributed data storage unit, the object management system preferentially returns a hostname and pathname of a copy of the data file that is stored within that distributed data storage unit. The object management system also makes redundant copies of the data files in different units to provide high availability of data.

15 Claims, 8 Drawing Sheets

NETWORK-BASED DISK REDUNDANCY STORAGE SYSTEM AND METHOD

BRIEF DESCRIPTION OF THE INVENTION

The present invention relates generally to computer data storage. More specifically, the present invention relates to a high-availability data storage methodology for a computer network.

BACKGROUND OF THE INVENTION

RAID (Redundant Array of Inexpensive Disks) technology, which uses multiple disk drives attached to a host computer, is a way of making a data store highly available. The RAID controller or host software makes a redundant copy of the data, either by duplicating the writes (RAID 1), establishing a parity disk (RAID 3), or establishing a parity disk with striped writes (RAID 5). Greater levels of redundancy can be achieved by increasing the number of redundant copies.

Although RAID technology provides a highly available disk array, data availability is not guaranteed. For instance, if the host computer fails, data becomes unavailable regardless of how many redundant disk arrays are used. In order to provide an even higher level of data availability, dual-ported arrays, which are accessible by two host computers, are used. The two host computers establish a protocol between them so that only one writes to a given disk segment at a time. If one host computer fails, the surviving host computer can take over the work of the failed computer. This type of configuration is typical in network file servers or data base servers.

A disadvantage of dual-ported disk arrays, however, is that they use a number of rather expensive components. Dual-ported RAID controllers are expensive. Moreover, a complex protocol is used by the hosts to determine which is allowed to write to each disk and when they are allowed to do so. Often, host manufacturers charge a substantial premium for clustering software.

Beside the high costs of system components, another disadvantage of dual-ported disk array systems is that the number of host computers that can simultaneously access the disk array is restricted. In dual-ported disk array systems, data must be accessed via one or the other host computer. Thus, the number of data access requests that can be serviced by a disk array system is limited by the processing capability of the host computers.

Yet another disadvantage with multi-ported disk arrays is that expanding the storage requires upgrading the disk array (for storage) or host computer (for processing). There are RAID arrays that expand by adding disks on carrier racks. However, once a carrier rack is full, the only way to expand the array is to get a new, larger one. The same situation holds for the host computer. Some host computers, such as Sun 6500, from Sun Microsystems of Mountain View, Calif., may be expanded by adding more processors and network interfaces. However, once the computer is full of expansion cards, one needs to buy a new computer to expand.

SUMMARY OF THE INVENTION

An embodiment of the present invention is a distributed and highly available data storage system. In one embodiment, the distributed data storage system includes a network of data storage units that are controlled by an object management system. Significantly, whenever data is written to one data storage unit, the object management system makes a redundant copy of that data in another data storage unit. The object management system preferentially selects the distributed data storage units for performing the file access requests according to the external inputs/outputs with which the file access requests are associated. In response to a file creation request that is associated with an external input of one distributed data storage unit, the object management system will preferentially create a data file in that distributed data storage unit. In response to a file retrieval request that is associated with a data file and an external output of another distributed data storage unit, the object management system will preferentially return a hostname and pathname of a copy of the data file that is stored within that distributed data storage unit. The object management system also makes redundant copies of the data files in different units to provide high availability of data.

An aspect of the present invention is that it is not necessary to use expensive RAID servers. Rather, inexpensive, commodity disk servers can be used. The distributed and highly available data storage system is also highly scalable, as additional disk servers can be added according to the storage requirement of the network.

Another aspect of this invention is that dedicated servers for the disk service functions are not required. Disk service functions can be integrated into each data storage unit. The data storage units may be implemented using relatively low cost, general-purpose computers, such as so-called desktop computers or personal computers (PCs). This aspect is of importance to applications where I/O, CPU, and storage resources follow a proportional relationship.

Yet another aspect of the present invention is that users of the system are not tied to any specific one of the data storage units. Thus, individual users may exceed the storage capacity of any given data storage unit. Yet another aspect of the present invention is that an expensive TDM (Time Domain Multiplexed) switching infrastructure is not required. An inexpensive high-speed Ethernet network is sufficient to provide for the necessary interconnection. Yet another aspect of the present invention is that the data storage system is scalable to the number of its external I/Os.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE PREFERRED EMBODIMENTS

Reference will now be made in detail to the preferred embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

System Components of the Data Storage System of the Present Invention

Figure 1:
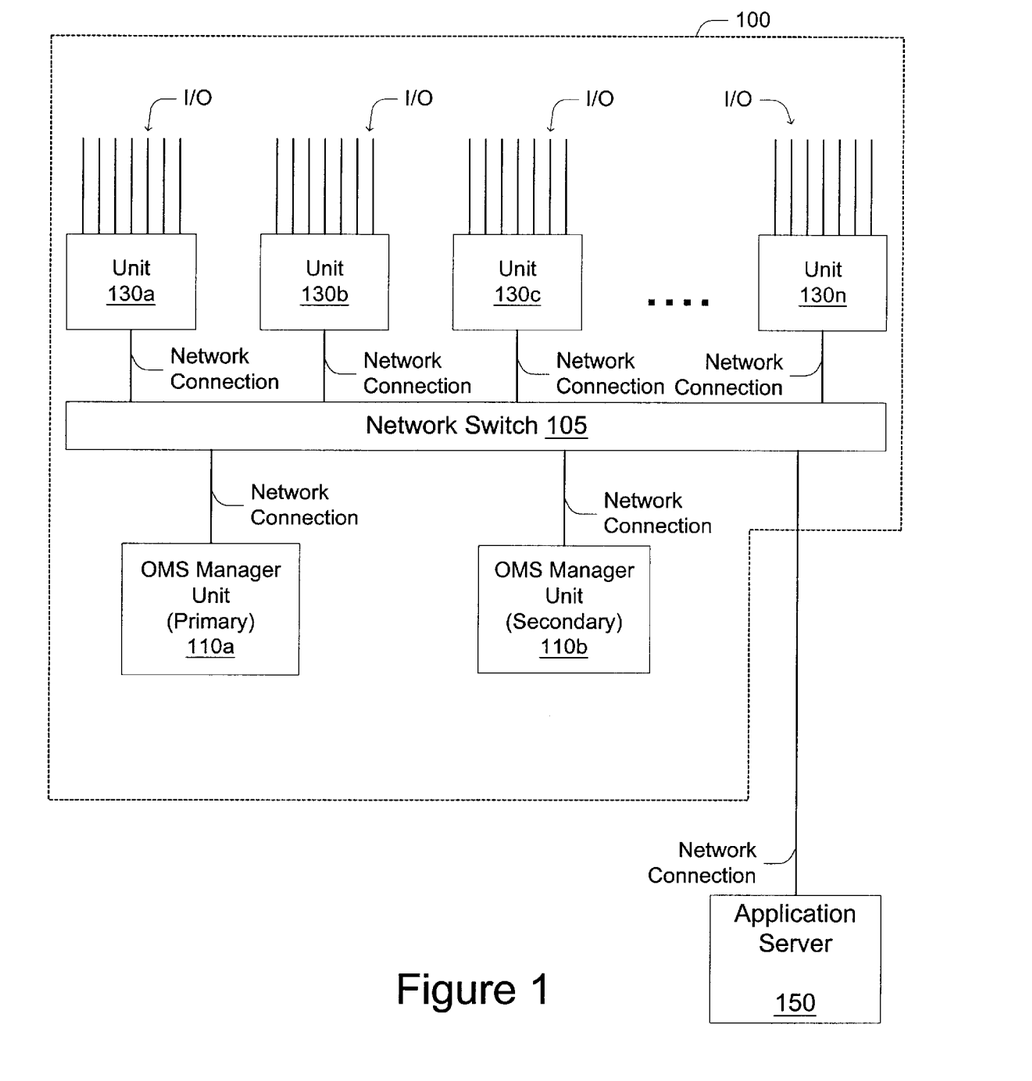
FIG. 1 is a block diagram illustrating a data storage system according to an embodiment of the present invention.

FIG. 1 is a block diagram illustrating a data storage system 100 according to an embodiment of the present invention. As illustrated, the data storage system 100 includes a network switch 105 coupled to distributed data storage units 130a–130n and OMS (Object Management System) managers 110a–110b One embodiment of the present embodiment is implemented using a 100BaseTX Ethernet network, and thus, the network switch 105 is a high-speed Ethernet switch, such as the Nortel Networks Accelar 1200. In other embodiments of the invention, other types of networks, such as an ATM network may be used to interconnect the distributed data storage units 130a–130n and the OMS managers 110a–110b. Also illustrated is an application server 150 that may be coupled to access the data storage system 100 via the network switch 105. Application programs, such as voice message application programs, may reside on the application server 150.

The distributed data storage units 130a–130n are the units of storage and disk redundancy. In the present embodiment, each of the distributed data storage units 130a–130n has a plurality of external input/output (I/O) lines for coupling to an external system, such as a public exchange (PBX) system. Each of the distributed data storage units 130a–130n also has its own processing resources. In one embodiment, each distributed data storage unit is implemented using a low cost general purpose computer.

The object management system (OMS) of the data storage system 100 resides on the distributed data storage units 130a–130n and two OMS managers 110a–110b. The OMS provides name translation, object location, and redundancy management for the system 100. The OMS uses a closely-coupled redundancy scheme to provide a highly-available object management system service.

In the present embodiment, the OMS manager resides on two computer systems to provide high-availability and fault tolerance capability. That is, if one of the primary OMS manager 110a crashes or otherwise becomes unavailable, the secondary OMS manager 110b may be used. In other embodiments, the object management system may run on specialized data processing hardware, or on a single fault-tolerant computer.

Figure 2:
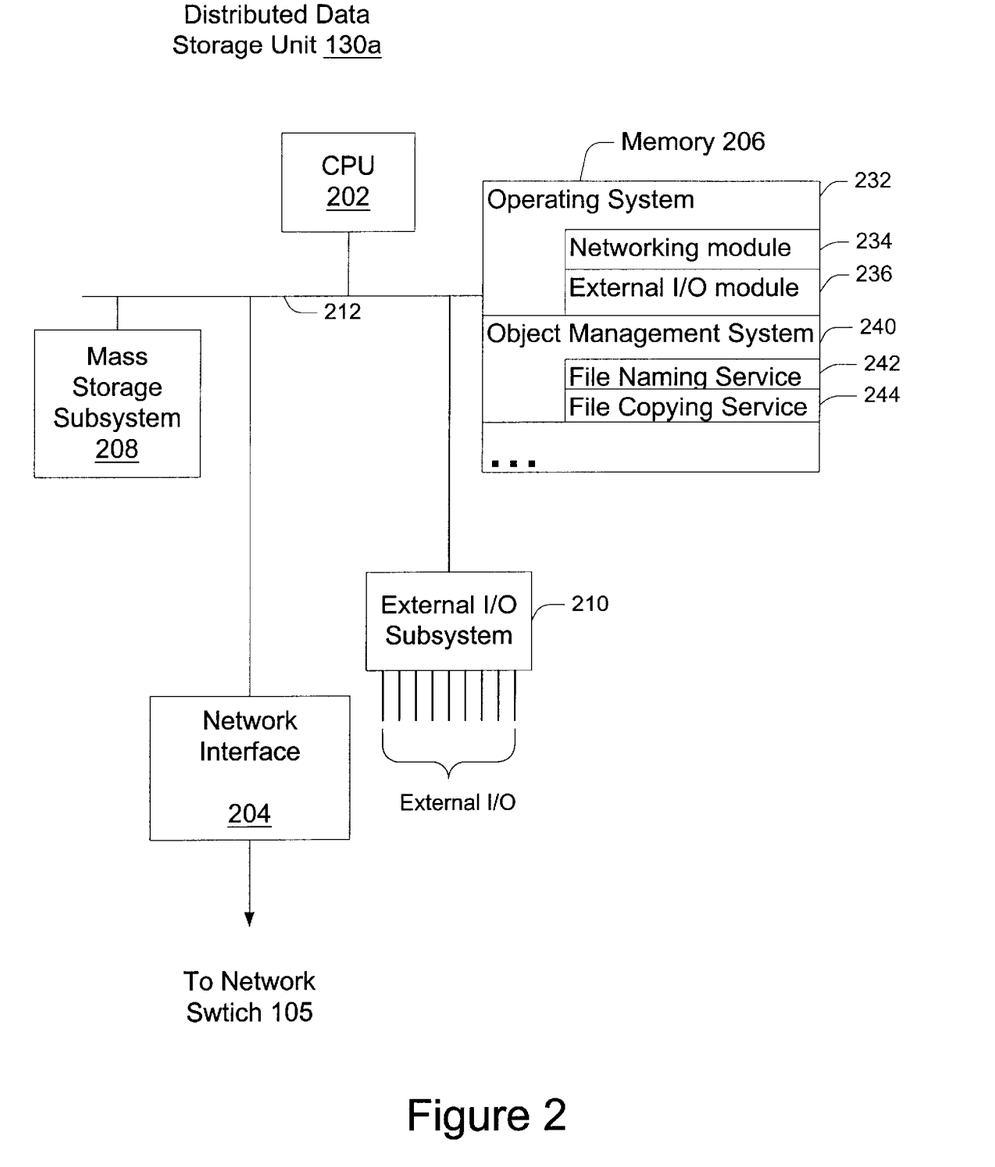
FIG. 2 is a block diagram illustrating the components of a distributed data storage unit in accordance with an embodiment of the present invention.

FIG. 2 is a block diagram illustrating the components of the distributed data storage unit 130a in accordance with an embodiment of the present invention. Components of the distributed data storage units 130b–130n are similar to those of the illustrated unit. As shown, data storage unit 130a includes a central processing unit (CPU) 202, a network interface 204 for coupling to network switch 105, a memory 206 (which may include random access memory as well as disk storage and other storage media), a mass-storage subsystem 208 (which may include a disk subsystem for storing voice mail messages), an external I/O subsystem 210 (which may include one or more voice cards for communicating with a public service telephone network), and one or more buses 212 for interconnecting the aforementioned elements of system 130a.

The network interface 204 provides the appropriate hardware and software layers to implement networking of the distributed data storage units. In the preferred embodiment, the network interface 204 is a 100BaseTX Ethernet network interface, running the TCP/IP network stack.

The external I/O subsystem 210 provides the appropriate hardware and software layers to implement the interface to the outside world for the server. It may be another Ethernet interface to serve web pages, for example. It may be a Natural Microsystems AG4000c to interface with the Public Switched Telephony Network. In the preferred embodiment, it is a Natural Microsystems CG6000c to interface with the packet telephony network. It can be a combination of these or other external interfaces. Alternately, the external I/O subsystem 210 may be a virtual interface: one can serve TCP/IP-based services over the network interface 210. It should be note that the external I/O subsystem is optional. For example, the distributed data storage unit 130a can simply be a file server for the network, using the network interface 204 for service access.

The mass storage subsystem 208 provides file service to the CPU 202. In the present embodiment, the mass storage subsystem 208 runs the VxFS operating system from Veritas. Alternate embodiments include the Unix File System (UFS) or the WindowsNT File System (NTFS).

Operations of the distributed data storage unit 130a are controlled primarily by control programs that are executed by the unit's central processing unit 202. In a typical implementation, the programs and data structures stored in the system memory 206 will include:

an operating system 232 (such as Solaris, Linux, or WindowsNT) that includes procedures for handling various basic system services and for performing hardware dependent tasks;

networking software 234, which is a component of Solaris, Linux, and Windows2000;

applications 236 related to the external I/O subsystem (e.g., an inbound voice message storage module for storing voice messages in user voice mailboxes, a voice message playback module, etc.); and necessary components of the object management system 240.

The components of the object management system 240 that reside in memory 206 of the distributed data storage unit 130a preferably include the following:

a file naming service 242; and a file copying service 244.

Figure 3:
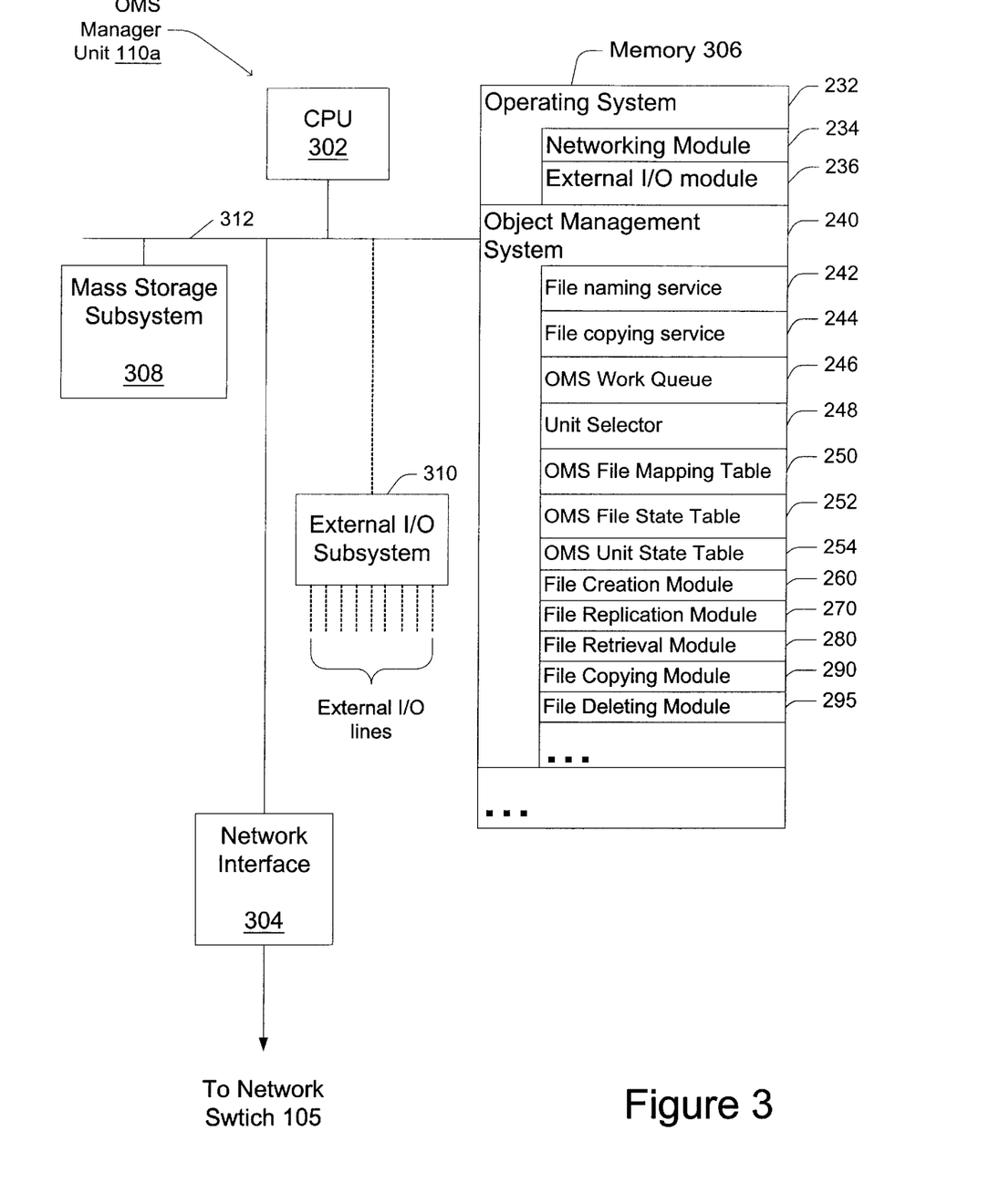
FIG. 3 is a block diagram illustrating the components of an OMS manager unit in accordance with an embodiment of the present invention.

FIG. 3 illustrates the components of an OMS manager unit 110a in accordance with an embodiment of the present invention. Components of the secondary OMS manager unit 110b are similar to those of the illustrated unit 110a. As shown, OMS manager unit 110a includes a central processing unit (CPU) 302, a network interface 304 for coupling to network switch 105, a memory 306 (which may include random access memory as well as disk storage and other storage media), a mass-storage subsystem 308 (which may include a disk subsystem for storing voice mail messages), and one or more buses 312 for interconnecting the aforementioned elements of system 110a. The OMS manager unit 110a may also include an optional external I/O subsystem 310.

The OMS manager unit 110a may include components similar to those of the distributed data storage unit 130a. Operations of the OMS manager unit 110a are controlled primarily by control programs that are executed by the system's central processing unit 302. The software running on the OMS manager unit 110a, however, may be different. Particularly, as shown in FIG. 3, the programs and data structures stored in the system memory 306 may include:

- an operating system 232 (such as Solaris, Linux, or WindowsNT) that includes procedures for handling various basic system services and for performing hardware dependent tasks;
- networking software 234, which is a component of Solaris, Linux, and Windows2000;
- applications 236 related to the external I/O subsystem (e.g., an inbound voice message storage module for storing voice messages in user voice mailboxes, a voice message playback module, etc.); and
- necessary components of the object management system 240.

The components of the object management system 240 that reside on the OMS manager unit 110a include the following:

- a file naming service 242;
- a file copying service 244;
- an OMS work queue 246;
- a unit selector module 248;
- an OMS file mapping table 250;
- an OMS file state table 252; and
- an OMS unit state table 254.

According to the present embodiment, the file naming service 242 is for obtaining a unique file name in the OMS manager unit 110a. The file copying service 244 is for copying files to and from the OMS manager unit 110a. The OMS work queue 246 is for storing file access requests from the applications. The unit selector module 248 is for selecting one of the distributed data storage units 130a–130n for carrying out the file access or duplication requests. The OMS file mapping table 250 stores the correlation between a file's name in the application name-space (or "handle") and the actual location of the file. The OMS file state table 252 stores the status of the files stored by the data storage system 100. The OMS file state table 252 also keeps track of a "link count" for each of the files stored by the data storage system 100. The OMS unit state table 254 stores the status of the distributed data storage units 130a–103n.

The secondary OMS manager unit can take over when the primary OMS manager unit is down.

Tables 1–4 below illustrate exemplary OMS work queue 246, OMS file mapping table 250, OMS file state table 252, and OMS unit state table 254, and their respective contents.

TABLE 1

OMS Work Queue

| handle | hostname | pathname | command |
|---|---|---|---|
| MyFileName | Unit3 | /infiles/V00,1/infile.tif | new |
| MyOtherName | Unit2 | /infiles/V00,1/voice.vox | copy |
| DeleteThis | | | delete |

TABLE 2

OMS File Mapping Table

| handle | hostname | pathname |
|---|---|---|
| MyOtherName | Unit2 | /infiles/V00,1/voice.vox |
| MyOtherName | Unit5 | /u2/V99,7/f19283.vox |
| DeleteThis | Unit7 | /u1/V23,44/2308fasd.tif |
| DeleteThis | Unit1 | /infiles/V21,8/3q49-7n.tif |

TABLE 3

OMS File State Table

| handle | state | link count |
|---|---|---|
| MyFileName | New | 1 |
| MyOtherName | OK | 2 |
| AnotherFile | OK | 1 |

TABLE 4

OMS Unit State Table

| hostname | state |
|---|---|
| Unit1 | UP |
| Unit2 | MAINT |
| Unit3 | UP |
| Unit4 | DOWN |
| Unit5 | UP |
| Unit6 | UP |
| Unit7 | UP |
| Unit8 | MAINT |

Operations of the OMS 240 will be discussed in greater detail below.

Operations of the Object Management System

Figure 4:
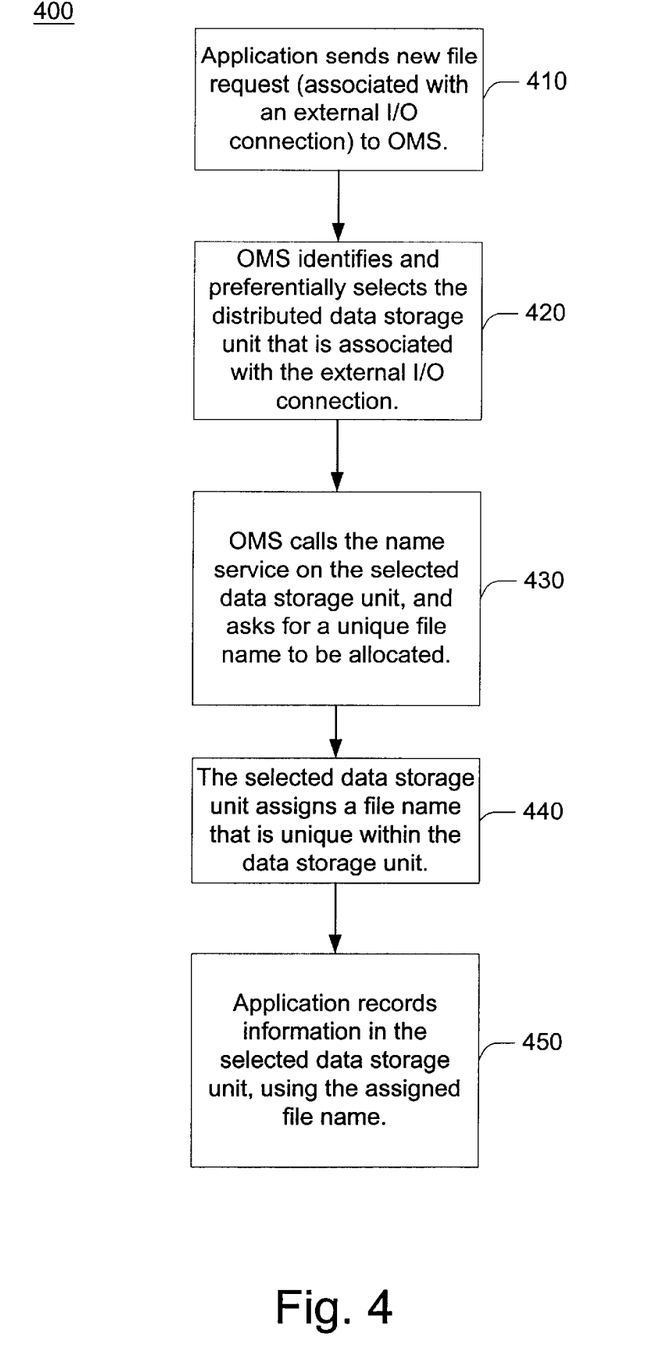
FIG. 4 is a flow diagram illustrating the operations of the data storage system of FIG. 1 when creating a new file.

FIG. 4 is a flow diagram 400 illustrating the operations of the data storage system 100 when creating a new file. As shown, in step 410, when an application (e.g., a voice message application program running on application server 150) needs to create a new data file, the application sends a request to the object management system (OMS) 240 of the data storage system 100. Preferably, the request for a new file has an association with an external 110 connection. The request is preferably sent to the primary OMS manager unit 110a. Then, in step 420, the file creation module 260 of the OMS 240 identifies and preferentially selects the distributed data storage unit that is associated with the external I/O connection. But if the data storage unit that is associated with the external I/O connection is unavailable, the OMS selects an available data storage unit. The physical I/O stream from the external I/O connection is then converted into data packets, which are transmitted across the network and stored at the selected data storage unit.

With reference still to FIG. 4, in step 430, the file creation module 260 then calls the name service of the selected distributed data storage unit, asking for a unique file name to be allocated. In step 440, the name service of the selected data storage unit then assigns a file name that is unique within the particular distributed data storage system. In step 450, after the distributed data storage unit creates the file, the application then records information into the file.

According to one particular embodiment of the present invention, the data storage system 100 may be implemented as part of a voice message system. In this embodiment, a new file needs to be created for recording a new message when a call comes in on an external I/O connection. A voice message application, detecting that a call is coming in, will preferentially create a new file for recording the voice stream of the call. In the present example, the request for the new file is sent to the distributed data storage unit associated with the incoming call. Thus, the same data storage unit receiving the physical I/O stream will be used for recording the I/O stream.

Figure 5:
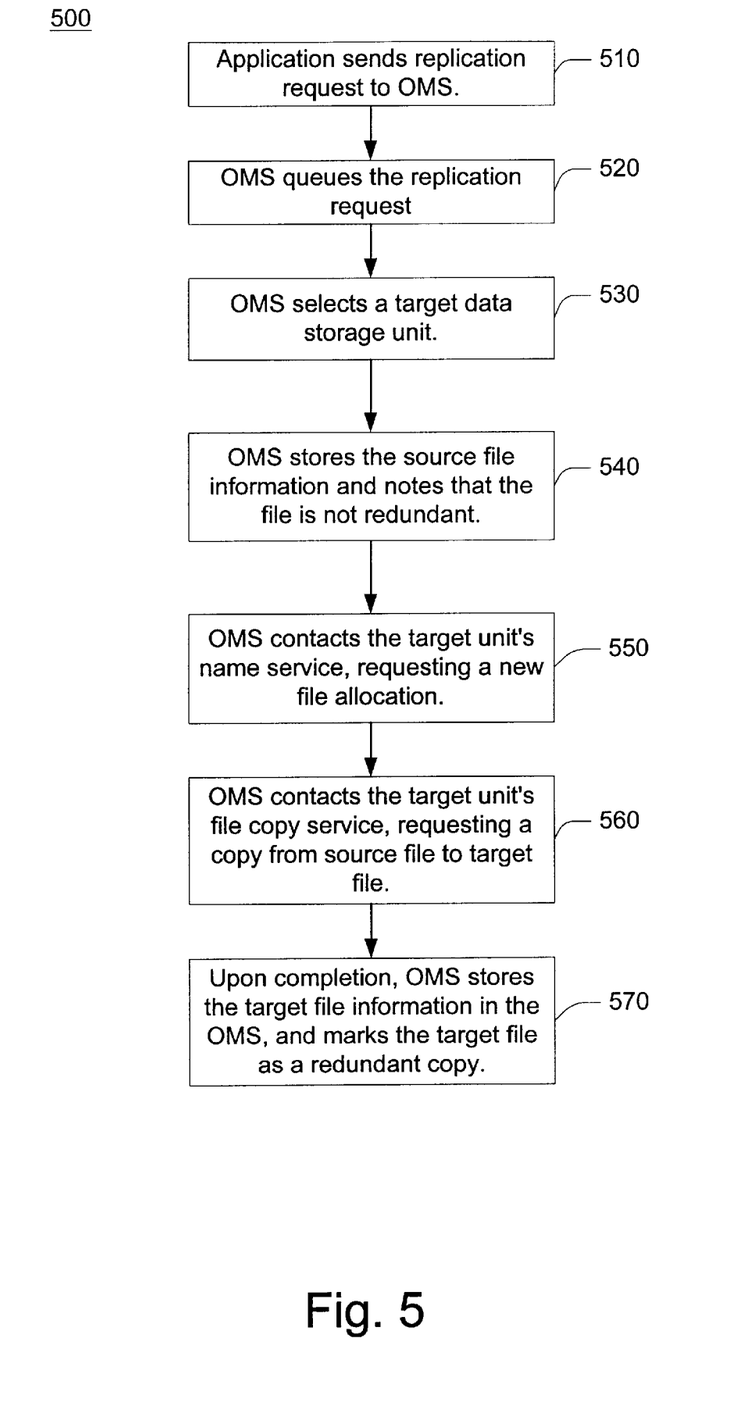
FIG. 5 is a flow diagram illustrating the operations of the data storage system of FIG. 1 when making a redundant copy of a file.

FIG. 5 is a flow diagram 500 illustrating the operations of the data storage system 100 when committing a file to redundant storage. As shown, in step 510, when the application is ready to commit the file to redundant storage, the application makes a replication request to the OMS 240. The replication request includes the source hostname, the name of the file to be replicated, and the name of the replicated file. In step 520, the OMS queues the replication request in the OMS work queue 246. If the application needs to know immediately when replication is complete, the OMS 240 may perform the replication immediately and may synchronously inform the application through synchronous remote procedure call mechanisms.

With reference still to FIG. 5, in step 530, when the OMS 240 works through the OMS work queue 246 and finds a replication request, the file replication module 270 of the OMS 240 selects a target data storage unit for copying the file. In one embodiment, the replication module 270 uses the selector module 248 that has knowledge of the current state of each distributed data storage unit 130a–130n. The selector module 248 selects a target unit based on current disk, CPU, and I/O utilization. The selector module 248 may also allow a newly installed distributed data storage unit to get the bulk of copies without overwhelming it. Alternately, the selector module 248 may use less sophisticated algorithms. For instance, the selector module 248 may always pick the distributed data storage unit to the "left" of the source data storage unit. The selector module 248 may also randomly pick one of the distributed data storage units 130a–130n for storing the replicated file.

In step 540, the file replication module 270 stores the source file information, noting the file is not redundant. Prior to replication, the source file is initially denoted as not redundant to protect against a system failure while the file is being replicated. In step 550, the file replication module 270 contacts the target data storage unit's name service, requesting a new file name allocation. In step 560, upon successfully obtaining a new file name from the target data storage unit, the file replication module 270 contacts the target data storage unit's file copy service, requesting a copy from the source file to the target file. In step 570, when the copy is complete, the file replication module 270 stores the destination file information. After successfully replicating the file, the file replication module 270 marks the file as being redundant. At this point, the OMS 240 has a relationship between the file's name in the application name-space and the OMS name space.

According to one embodiment of the invention, the OMS 240 also stores a link count for each file in the OMS file state table 252. The link count is the number of unique application references to the given file. When the application creates a file in the OMS 240, the OMS 240 sets the link count to one. When the application copies the file in the OMS 240, the OMS 240 increments the link count. Likewise, when the application deletes the file, the OMS 240 decrements the link count.

Figure 6:
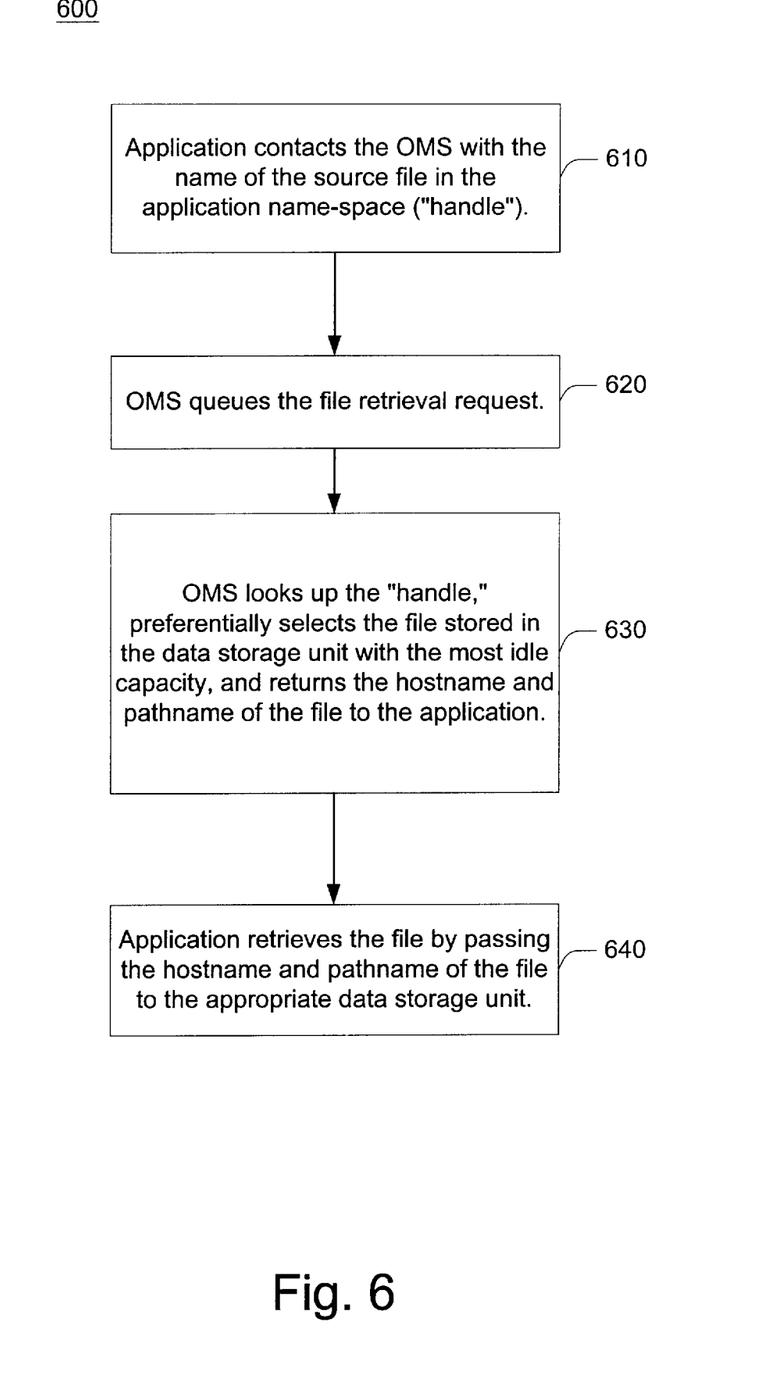
FIG. 6 is a flow diagram illustrating the operations of the data storage system of FIG. 1 when an application is retrieving a file.

FIG. 6 is a flow diagram 600 illustrating the operations of the data storage system 100 when an application is retrieving a file. As shown, in step 610, the application contacts the OMS 240 with the name of the source file in the application name-space (or "handle"). In step 620, the OMS 240 queues the request in the OMS work queue 246. In step 630, when the OMS 240 works through the OMS work queue 256 and finds the file retrieval request, the file retrieval module 280 of the OMS 240 then looks up the "handle" from the OMS file mapping table 250. Assuming that multiple copies of the file are stored in the data storage system 100, the OMS 240 will preferentially select a copy that is stored within the data storage unit with the most idle capacity. The OMS 240 then returns the hostname and pathname of the file to the application. In the present embodiment, the file retrieval module 280 may use the unit selector module 248 to choose the preferred distributed data storage unit. To provide a high-available service, the file retrieval module 280 will not return a file stored on an unreachable node. Since multiple copies of every file (except the most recently created files that have not yet been replicated) are stored in the system 100, the OMS 240 should be able to find a copy of any specified file on a running unit, even when one of the data storage unit has failed. In an alternate embodiment, the file retrieval module 280 returns information on all copies of the file to allow the application to choose the best file copy to use.

With reference still to FIG. 6, in step 640, after obtaining the hostname and pathname of the file from the OMS 240, the application retrieves the file by passing the hostname and pathname to the appropriate distributed data storage unit. In the present embodiment, a host-to-host binary copy protocol, such as CacheFS from Sun Microsystems, may be used to send the file to the requesting application or to a destination specified by the requesting application.

Figure 7:
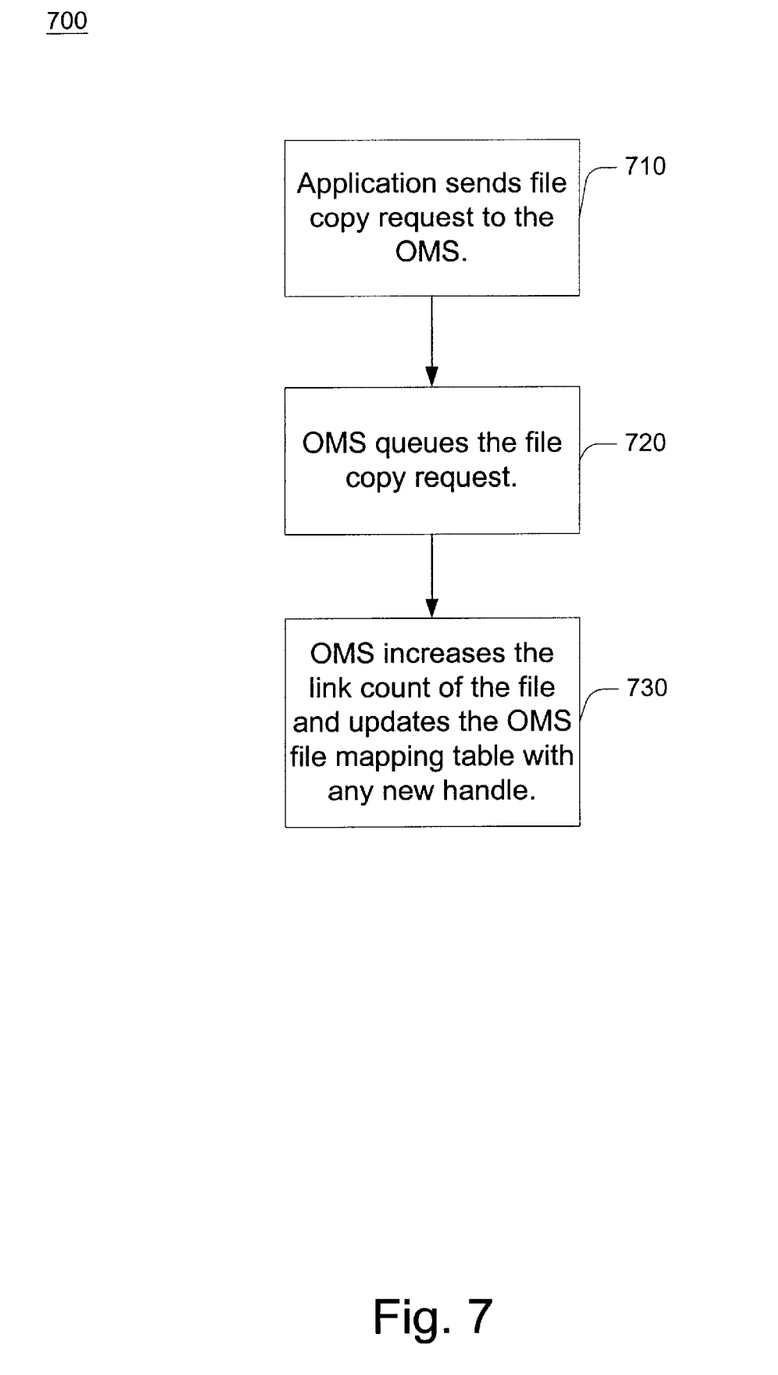
FIG. 7 is a flow diagram illustrating the operations of the data storage system of FIG. 1 when an application copies a file.

FIG. 7 is a flow diagram illustrating the operations of the data storage system 100 when an application copies a file. As shown, in step 710, the application sends a copy request to the OMS 240. The copy request includes a file name in the application name space. In step 720, the OMS queues the file copy request in the OMS work queue 246. In step 730, when the OMS 240 works through the OMS work queue 246 and finds the file copy request, the file copying module 290 increases the link count for the underlying file and updates the OMS file mapping table 250 with any new application file name. Note that the OMS 240 does not copy any data.

Figure 8:
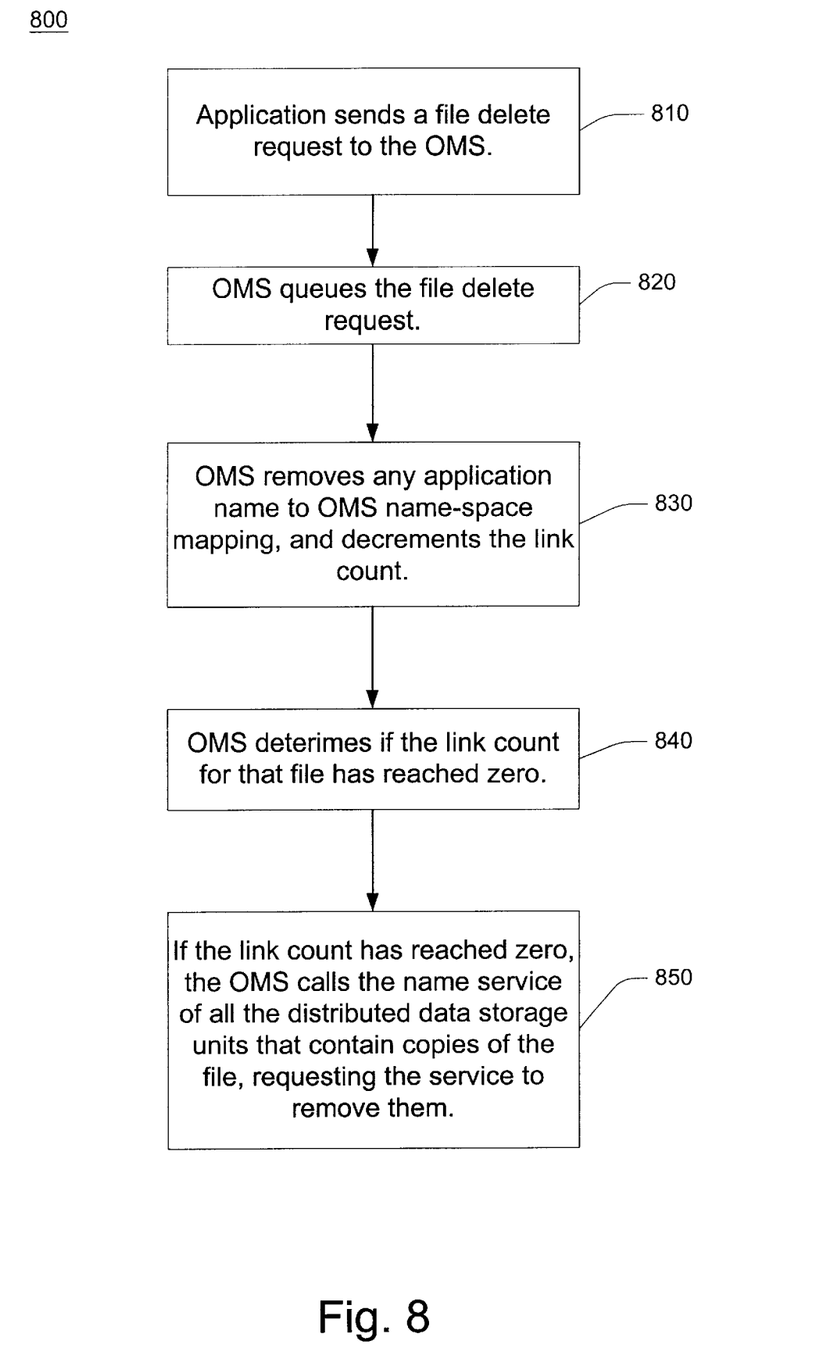
FIG. 8 is a flow diagram illustrating the operations of the data storage system of FIG. 1 when an application deletes a file.

FIG. 8 is a flow diagram illustrating the operations of the data storage system 100 when an application deletes a file. As shown, in step 810, the application sends a delete request to the OMS 240. The delete request includes a file name in the application name space. In step 820, the OMS 240 queues the file delete request in the OMS work queue 246. In step 830, when the OMS 240 works through the OMS work queue 246 and finds the file delete request, the file removal module 295 removes any application name to OMS name-space mapping, and decrements the link count in the OMS file state table 252. In step 840, the file removal module 295 determines whether the link count has reached zero. In step 850, if the link count has reached zero, the OMS 240 proceeds to call the naming service 242 on the distributed data storage units 130a–130n that have copies of the file, requesting the service 242 to remove the copies.

According to the present invention, the OMS 240 manages the state of the distributed data storage units 130a–130n. An operator may take one of the distributed data storage units 130a–130n out of service for maintenance purposes. To take a data storage unit out of service, the operator marks the unit record in the OMS unit state table 254 to indicate the unit is not available. When the data storage unit is in this state, the OMS 240 will not make copies to the unit and will not return files that are on the unit.

The unit also may become unavailable, or "down." The difference between "out of service" and "down" is that in the former case, there is an expectation the unit will become available shortly. A down node may never return to a functional state.

If a unit is down, the OMS 240 will make copies all of the files that were on the down unit to other units. The OMS 240 performs this function by looking at the OMS file mapping table 250, searching for files on the down unit. The OMS 240 looks for the redundant copies of the files, and it queues file copy requests for the surviving copies. Using the standard redundancy replication method described above, the OMS 240 will distribute the files to the other units. In the present embodiment, the OMS 240 queues the copy requests so that the OMS 240 can treat this activity at a lower priority than the normal request processing activity. This reduces the impact the failure has on the OMS 240 and the application.

Linear Scalability of the Data Storage System of the Present Invention

Attention now turns to how the data storage system 100 achieves near linear scalability. The following description assumes each distributed data storage unit 130a–130n has sufficient external I/O, storage, memory, and CPU to satisfy the requirements determined by the external I/O usage.

Let T be the amount of outbound OMS file copy traffic sent by a distributed data storage unit through its network interface 204 to other units. The units of T are bytes or packets per second. The file copy traffic T is equivalent to the amount of data stored due to traffic generated by the external I/O subsystem per unit time. For example, if data storage system 100 is implemented as part of a voice messaging system, file copy traffic T would be the amount of voice, fax, or data mail received through the external I/O subsystem 210 of the distributed data storage unit 130a.

On average each unit will also received file copy traffic at a rate of T to receive the files for which the unit provides redundant storage, since on average each unit stores approximately as many file replica copies as it stores original files. Thus, file copy traffic in and out of the unit's network interface averages T in each direction.

The traffic load V required to service application requests is not necessarily the same as the inbound traffic load T of new files. For instance, some messages may be accessed multiple times, while others may be deleted without being accessed. While V may be approximately equal to T in some systems, in other systems it may be significantly larger or smaller than T.

An additional source of file traffic through each units network interface 210 is traffic caused by the unit servicing application requests for files not found on the unit. If the average rate of outbound traffic from each unit for satisfying application requests is V, then the amount of inbound traffic via the network interface 210 required to support those requests is $((N-2)/N)V$ because each unit has, on average, locally stores $2/N$ of the files, and thus needs to obtain from other units $(N-2)/N$ of the files requested by the applications it is servicing.

Similarly, the other units will send a given unit requests for files they need to service applications. The total average rate at which all the units need files from other units to satisfy application requests is $((N-2)/N)NV$, and since this load is assumed to be evenly distributed over the N unit, the average outbound traffic load per unit to satisfy these requests is $((N-2)/N)V$, which is the same as the average inbound traffic load required to satisfy application requests.

Thus, a given unit in the data storage system 100 has $T+((N-2)/N))V$ traffic in and $T+((N-2)/N))V$ traffic out. Note that as N grows large, the total traffic will approach a constant $T+V$ in and $T+V$ out of the unit.

This is a significant feature of the system 100. From a given unit's perspective, the scale of the system 100 has no impact on the given unit's resources. In fact, the limiting factors for the scale of the system 100 are the scale of the OMS 240 and the scale of the network. The OMS 240 may be scaled by running the OMS 240 on larger processors or by distributing the OMS 240. For instance, using a high capacity switched media network may be needed, depending on the amount of traffic to be supported by the system.

Alternate Embodiments

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data storage system comprising:
    a network;
    a plurality of distributed data storage units coupled to the network, the plurality of distributed data storage units having a plurality of external inputs and outputs; and
    an object management system (OMS) manager unit coupled to the plurality of distributed data storage units via the network, the OMS manager unit and the plurality of distributed data storage unit implementing an object management system, wherein the object management system preferentially selects a first one of the plurality of distributed data storage units for file access in response to a file access request provided that the file access request is associated with an external input/output of the first distributed data storage unit;
    wherein the object management system is configured such that, in response to a file retrieval request that is associated with a data file and an external output of the first distributed data storage unit, the object management system preferentially returns a hostname and pathname of a copy of the data file that is stored within the first distributed data storage unit.

2. The data storage system of claim 1, wherein the object management system, in response to a file creation request that is associated with an external input of the first distributed data storage unit, preferentially creates a data file in the first distributed data storage unit.

3. The data storage system of claim 1, wherein the object management system, in response to a file replication request that is associated with a data file stored within the first distributed data storage unit, makes a redundant copy of the data file in a second one of the plurality of the distributed data storage units.

4. The data storage system of claim 1, wherein the object management system, in response to a file delete request that is associated with a data file, removes copies of the data file from all of the distributed data storage units.

5. The data storage system of claim 1, wherein the plurality of distributed data storage units each comprise a commodity disk server.

6. The data storage system of claim 1, wherein the OMS manager unit comprises a personal computer.

7. The data storage system of claim 1, wherein the external inputs and outputs are configured for coupling to phone lines of a public exchange system.

8. The data storage system of claim 1, wherein the network comprises a switched-media network.

9. A computer program product for use in conjunction with a computer system coupled to a plurality of data storage systems via a network, the computer program product comprising a computer readable storage medium and a computer program mechanism embedded therein, the computer program mechanism comprising:

a module for receiving file access requests from an application; and an object management system for preferentially selecting a first one of the plurality of data storage units for file access in response to a file access request provided that the file access request is associated with an external input/output of the first data storage unit;

wherein the object management system comprises a file retrieval module that, in response to a file retrieval request that is associated with a data file and an external output of the first distributed data storage unit, preferentially returns a hostname and pathname of a copy of the data file that is stored within the first distributed data storage unit.

10. The computer program product of claim 9, wherein the object management system comprises a file creation module that, in response to a file creation request that is associated with an external input of the first distributed data storage unit, preferentially creates a data file in the first distributed data storage unit.

11. The computer program product of claim 9, wherein the object management system comprises a file replication module that, in response to a file replication request that is associated with a data file stored within the first distributed data storage unit, makes a redundant copy of the data file in a second one of the plurality of the distributed data storage units.

12. The computer program product of claim 9, wherein the object management system comprises a file removal module that, in response to a file delete request that is associated with a data file, removes copies of the data file from all of the data storage systems.

13. In a data storage system having a plurality of distributed data storage units, a method of accessing data, the method comprising:

interconnecting the distributed data storage units via a network switch;

receiving a file creation request, the file access request being associated with an external input/output of a first one of the plurality of distributed data storage units;

in response to the file creation request, preferentially selecting the first distributed data storage unit for creating a data file;

selecting a second one of the distributed data storage units if the first distributed data storage unit is unavailable;

routing data corresponding to the selected data storage unit via the network switch;

receiving a file retrieval from an application, the file retrieval request being associated with a data file and an external output of the first distributed data storage unit; and in response to the file retrieval request, preferentially returning to the application a hostname and pathname of a copy of the data file that is stored within the first distributed data storage unit.

14. The method of claim 13, further comprising:

receiving a file replication request that is associated with a data file stored within the first distributed data storage unit; and in response to the file replication request, making a redundant copy of the data file in a second one of the plurality of the distributed data storage units, including sending the data file from the first distributed data storage unit to the second distributed data storage unit via the network switch.

15. The method of claim 13, further comprising:

receiving a file delete request that is associated with a data file; and in response to the file delete request, removing copies of the data file from all of the distributed data storage units.

* * * * *